US006371646B1

(12) United States Patent
LaFleur

(10) Patent No.: US 6,371,646 B1
(45) Date of Patent: Apr. 16, 2002

(54) BULK BAG WITH MULTIPLE PLY WALLS AND A METHOD OF FORMING IT FROM TUBULAR BLANKS

(75) Inventor: Lee LaFleur, Manistee, MI (US)

(73) Assignee: Scholle Custom Packaging, Inc., Manistee, MI (US)

( * ) Notice: Subject to any disclaimer, the term of this patent is extended or adjusted under 35 U.S.C. 154(b) by 38 days.

(21) Appl. No.: 09/625,766

(22) Filed: Jul. 26, 2000

(51) Int. Cl.[7] .......................... B65D 30/08; B65D 33/38
(52) U.S. Cl. ........................ 383/109; 383/41; 383/67; 383/120; 383/904; 383/906; 493/210; 493/254; 493/244
(58) Field of Search ................................. 383/105, 109, 383/120, 904, 906, 41, 67; 493/210, 244, 254

(56) References Cited

U.S. PATENT DOCUMENTS

| 4,596,040 A | * | 6/1986 | LaFleur et al. ............... 383/41 |
| 5,104,236 A |   | 4/1992 | LaFleur |
| 5,556,205 A | * | 9/1996 | Gallie et al. ................ 383/109 |
| 5,618,254 A | * | 4/1997 | Derby ........................ 493/197 |
| 5,759,144 A | * | 6/1998 | Derby ........................ 493/197 |
| 5,918,984 A | * | 7/1999 | LaFleur et al. ............... 383/8 |
| 5,984,850 A | * | 11/1999 | Derby ........................ 493/29 |
| 6,139,482 A | * | 10/2000 | LaFleur ...................... 493/217 |
| 6,196,719 B1 | * | 3/2001 | Brown ........................ 383/109 |
| 6,224,261 B1 | * | 5/2001 | Stone ......................... 383/104 |

* cited by examiner

Primary Examiner—Stephen P. Garbe
(74) Attorney, Agent, or Firm—Michael Best & Friedrich LLC

(57) ABSTRACT

A bulk bag or a liner for a bulk container is formed from a plurality of tubular blanks of flexible material so that each wall of the bag or liner has at least two layers of material. Desirably, many woven or plastic sheet materials suitable to make such bags or liners are available in elongate and circumferentially continuous tubular webs such that a plurality of liners or bags may be formed connected in end to end relation on an elongate web. In one form, a pair of gusseted tubular blanks are disposed between and sealed to a pair of overlying flat tubular blanks to define a liner or bag having two layers of material in each wall. In another form, a pair of tubular blanks are folded so that each tubular blank defines one flat panel and one gusseted panel and the tubular blanks are heat sealed along a pair of side edges of the liner or bag to also define a liner or bag having two layers of material in each wall. In still another form, a gusseted tubular blank may be disposed inside or outside of either of the previous forms to provide a liner or bag having each wall formed of three plies or layers of material. In any form, a bag or liner is provided with each wall formed from multiple layers of material and with each layer of each wall properly positioned and without having to stuff one bag or liner into another bag or liner.

15 Claims, 3 Drawing Sheets

BULK BAG WITH MULTIPLE PLY WALLS AND A METHOD OF FORMING IT FROM TUBULAR BLANKS

FIELD OF THE INVENTION

This invention relates generally to bulk containers and more particularly to bulk bags, and liners for bulk bags or other bulk containers, which are collapsible and formed of a flexible material.

BACKGROUND OF THE INVENTION

Many granular and liquid products have been shipped and stored in large bulk bags which may contain as much as a ton or more of material. Some of these bulk bags are flexible, contain a liner, and when empty can be folded to a generally flat condition. One such flexible bag and liner is disclosed and claimed in U.S. Pat. No. 5,104,236. These flexible bags and liners for bulk containers, have been formed from a single tubular blank of material to form generally rectangular ends interconnected by generally rectangular side walls. When filled, these bags can be stacked one on top of another. For some applications, the bags may be made of a woven fabric and for other applications, a plastic sheet material. For some applications, particularly for storing liquids, a bag or liner of a water or liquid impervious sheet material is received in and reinforced and protected by bag of a woven fabric. Usually these bags have a spout in one or both ends for filling and emptying the bags.

To provide a bag having walls formed from more than one layer of material, one bag has been stuffed into another bag of generally the same configuration, such as a liner being stuffed into a bulk bag. Unfortunately, it is difficult to accurately align the inner bag or liner with the outer bag and the inner liner may become bunched up or otherwise folded or creased within the outer bag. Upon filling, localized stresses occur within the inner bag or liner decreasing its effectiveness and potentially leading to a rupture of at least the inner bag or liner.

SUMMARY OF THE INVENTION

A bulk bag or a liner for a bulk container is formed from a plurality of tubular blanks of flexible material so that each wall of the bag or liner is formed from at least two layers of material. Desirably, many woven or plastic sheet materials suitable to make such bags or liners are available in elongate and circumferentially continuous tubular webs such that a plurality of liners or bags may be formed connected in end to end relation on an elongate web. In one form, a pair of gusseted tubular blanks are disposed between and sealed to a pair of overlying flat tubular blanks to define the liner or bag having a plurality of walls each formed from two layers of material. In an other form, a pair of tubular blanks are folded so that each tubular blank defines one flat panel and one gusseted panel and the tubular blanks are heat sealed together along a pair of side edges of the liner or bag to also define a liner or bag wherein each wall is formed from two layers of material. In still another form, a gusseted tubular blank may be disposed inside of or outside of either of the previous forms of the invention to provide a liner or bag having each wall formed of three plies or layers of material. In any form, a multiple layer bag or liner is provided with each wall formed from multiple layers of material and with each layer of each wall properly positioned and without having to stuff one bag or liner into another bag.

Objects, features and advantages of this invention include providing a bulk bag or liner which has each wall formed from multiple layers of material, accurately aligns and maintains in position, the various layers of material of each wall, reduces the likelihood of leakage of the contents of the bags, reduces the likelihood of rupture of any wall or seam, permits a plurality of bags to be readily formed from an elongate web of material, facilitates the manufacture of bags having walls formed from two or more layers of material, facilitates forming a plurality of bags from elongate tubular webs of material, is of relatively simple design and economical manufacture and assembly, and can be produced by a method which is substantially automated, efficient and relatively simple to perform.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
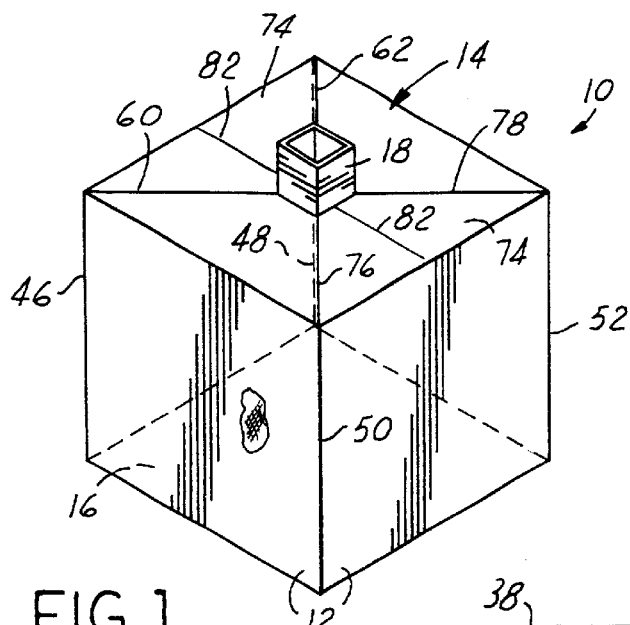
FIG. 1 is a perspective view of a bulk bag formed according to the present invention.
Figure 2:
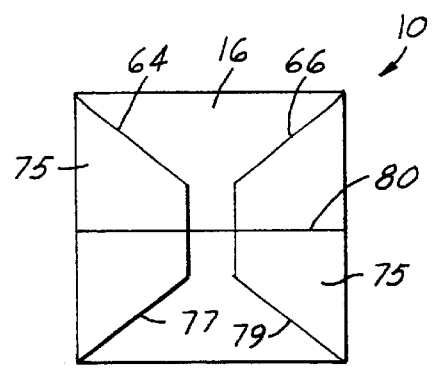
FIG. 2 is an end view of the bag of FIG. 1 illustrating a bottom wall of the bag.

Referring in more detail to the drawings, FIGS. 1 and 2 illustrate a bulk bag 10 or a liner for a bulk container having four interconnected rectangular side walls 12 and generally rectangular top and bottom walls 14, 16 connected to the side walls 12, with each wall 12, 14, 16 formed from at least two layers of material. A spout 18 may be integrally provided in one or both of the top and bottom walls 14, 16 and separate spouts may be attached to one or more of the top, bottom and side walls if desired. The bag or liner 10 may be formed from a flexible woven material or from a flexible plastic sheet material and a liner is usually formed from a flexible plastic sheet material impervious to liquid as desired for a particular application. The bag or liner 10 is formed from a flexible material and can be folded generally flat when empty, and when filled forms the generally cubical configuration shown in FIG. 1. Such a bag 10 may be made in a variety of sizes and is suitable to contain a wide range of flowable materials including granular products and liquids. In the trade, "bag" usually refers to the primary load carrying portion of the container and liner usually refers to the liquid barrier or the container and a liner may be disposed inside or outside of the bag or other primary load carrying portion of the container. As used in this description and the claims the term "bag" is broad enough to also encompass or include a liner.

Figure 3:
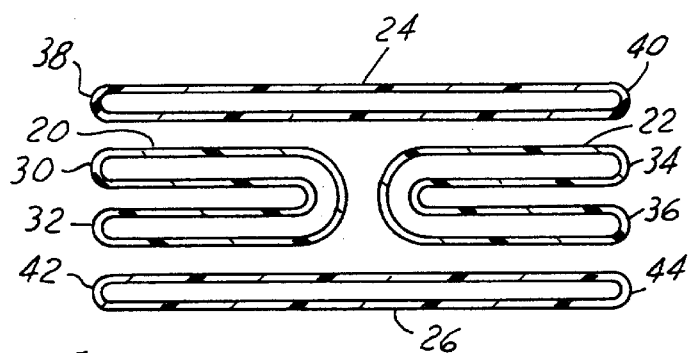
FIG. 3 is an end view of a plurality of tubular blanks positioned to form a multiple walled bulk bag embodying the invention.
Figure 4:
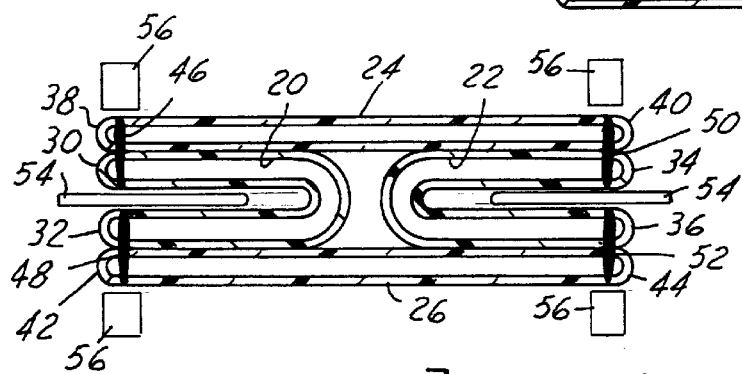
FIG. 4 is an end view as in FIG. 3 illustrating the plurality of tubular blanks of FIG. 3 joined together by heat seals to define in part the bulk bag.
Figure 5:
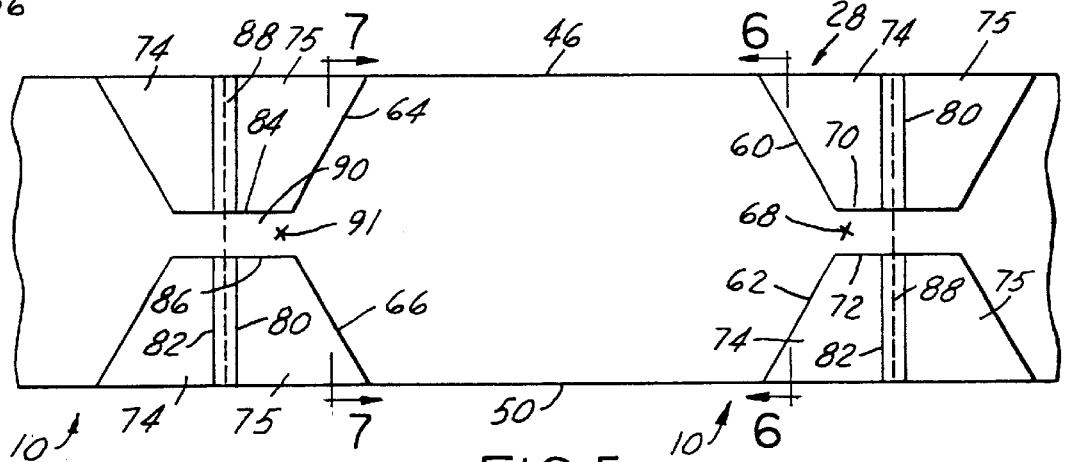
FIG. 5 is a plan view illustrating an elongate web having a plurality of bulk bags formed and connected in end to end relation in the web.

As shown in FIGS. 3 and 4, the bag or liner 10 is formed from a plurality of tubular blanks 20, 22, 24, 26 of material. Each tubular blank 20, 22, 24, 26 is preferably circumferentially continuous and elongate so that, as shown in FIG. 5, a plurality of bags or liners 10 may be formed from an elongate tubular web 28 of material with the bags 10 interconnected in end to end relation in the web 28. The tubular blanks 20, 22, 24, 26 may also be used in discrete lengths suitable for forming individual bags.

As best shown in FIGS. 3 and 4, a first pair of tubular blanks 20, 22 are folded in half or gusseted and are disposed between a second pair of generally flat tubular blanks 24, 26. The gusseted blanks 20, 22 are preferably mirror images of each other and when folded define a generally U-shaped configuration with the open end of the "U" of the tubular blanks facing in generally opposed directions and with the free edges 30, 32, 34, 36 of the blanks 20, 22 generally aligned with an associated edge 38, 40, 42, 44 of the flat blanks 24, 26. Adjacent portions of the gusseted tubular blanks 20, 22 are heat sealed at their outer edges 30, 32, 34, 36 to the corresponding outer edges 38, 40, 42, 44 of the overlying flat tubular blanks 24, 26 as shown in FIGS. 4 and 5. Specifically, edge 30 is sealed to edge 38 along line 46, edge 32 is sealed to edge 42 along line 48, edge 34 is sealed to edge 40 along line 50 and edge 36 is sealed to edge 44 along line 52. A rubber pad 54, Teflon coated pad or other object having low thermal conductivity is disposed in each gusseted tubular blank 20, 22 in the area of a heat sealer 56 to prevent the adjacent portions of the gusseted blanks 20, 22 from being heat sealed to each other. When connected in this fashion, a circumferentially continuous blank is formed with the flat tubular blanks 24, 26 arranged to define a pair of opposed side walls 12 of the bag 10 and the gusseted tubular blanks 20, 22 arranged to define a second pair of opposed side walls 12 of the bag 10 when filled. The juncture or connection between each adjacent side wall 12 is formed by a heat seal line 46, 48, 50, 52 extending the full length of the side walls 12.

Figure 6:
FIG. 6 is a cross-sectional view taken generally along line 6—6 of FIG. 5.
Figure 7:
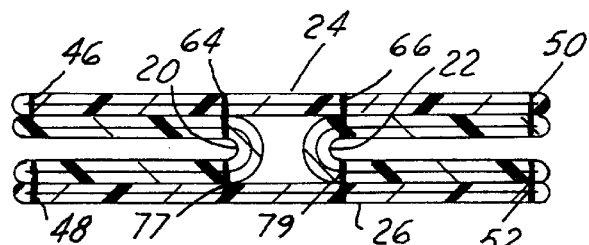
FIG. 7 is a cross-sectional view taken generally along line 7—7 of FIG. 5.

As shown in FIGS. 5–7, to provide generally rectangular end walls 14, 16 when the bag 10 is expanded, the bag 10 is heat sealed along inclined lines of connection 60, 62, 64, 66 extending from the heat seal lines 46, 48, 50, 52 which define the juncture between adjacent side walls 12. To provide a square end wall 14 or 16, the inclined lines 60, 62, 64, 66 extend at an included angle of 45° relative to the side edges of the blank defined by heat seal lines 46, 48, 50, 52. To provide an access opening in at least one end of the bag 10, such as in the top wall 14, the seal lines 60, 62 at that end are terminated short of the point 68 wherein they would intersect each other and generally parallel, spaced apart heat seal lines 70, 72 are formed from the end of the bag 10 to the inclined lines of connection 60, 62. Formed in this manner, excess material is disposed outboard of the inclined lines of connection 60, 62 and heat seal lines 70, 72 and may be either removed from the bag 10 or left on the bag 10 providing an overlapping portion 74 of material on the opposed top and bottom walls 14, 16 of the bag 10 which may function as reinforcement and protection from puncture of the bag as disclosed in U.S. Pat. No. 4,596,040, the disclosure of which is incorporated herein by reference in its entirety.

As best shown in FIG. 6, the inclined lines of connection 60, 62 extend only through the upper tubular blank 24 and the adjacent panel of the gusseted tubular blanks 20, 22 with the rubber or Teflon pad 54 inserted in the region of the fold and between the overlying portions of the gusseted tubular blanks 20, 22 to prevent them from being heat sealed together. Likewise, complementary inclined lines of connection 76, 78 interconnect the lower tubular blank 26 to the immediately adjacent portions of the gusseted tubular blanks 20, 22 to form the generally square or rectangular top and bottom walls 14, 16 of the bag 10. As shown in FIG. 7, the same relationship exists at the other end of the blank with inclined heat seal lines 64, 66 and 77, 79 as shown, which define corresponding overlapping portions 75.

As best shown in FIG. 5, to connect together adjacent overlapping portions 74, 75 of the bag 10, heat seal lines 80, 82 are formed at each end of the bag 10 from the side edges of the bag extending inwardly. To form an opening through the spout 18 in the top wall 14, the line 82 at that end of the blank is terminated at the spaced apart parallel lines 70, 72 and does not extend between them. At the bottom wall 16 of the bag 10, the heat seal line 80 connecting adjacent overlapping portions 75 preferably extends completely from one side edge of the bag 10 to the other, so that the bottom wall 16 of the bag 10 is completely closed. However, a spout may be formed in the bottom wall 16 of the bag 10, if desired, in a similar manner by interrupting the heat seal line 80 so that it does not extend between spaced apart parallel lines 84, 86 at the bottom of the bag 10. Perforations 88 are provided in a line outboard of the lines 80, 82 at each end of the bag 10 to facilitate separating a bag 10 from the web 28.

Preferably, at least in the bottom wall 16 of the bag 10, the inclined lines of connection 64, 66 extend at an angle between 43 and 45 degrees, and preferably less than 45 degrees to avoid forming a perfectly square bottom wall of the bag 10. When formed at an angle of less than 45 degrees, a slight excess or reserve portion 90 of material is provided in the bottom wall 16 of the bag 10 when the sidewalls are constructed and arranged so that their edges adjacent to and adjoining the bottom wall are of the same length defining a square boundary at these edges. This prevents the bottom wall 16 from being pulled taut even when the bag 10 is filled and is disposed on a supporting surface, greatly reduces the strain on the bottom wall 16 of the bag 10 and increases the load bearing capacity of the bag 10. A similar excess of material can be provided in any bag, including bags with rectangular or non-square end walls, by sealing along inclined lines of connection which are at an included angle less than that needed to form a flat bottom wall for the given sidewall configuration and arrangement.

Additionally, terminating the inclined lines of connection 64, 66 short of their point of intersection 91 and forming the spaced apart parallel lines 84, 86 extending to the seal 80 at the bottom end of the bag 10 is desirable even if no spout or access opening is to be provided therein to reduce the number of layers of material which are heat sealed together.

If the lines of connection 64, 66 were to intersect each other, then at the intersection twice the number of layers of material must be heat sealed together compared to the remainder of the heat seal lines. For example, in a bag 10 having walls 12, 14, 16 each formed from two layers of material, eight layers of material would have to be heat sealed together at the intersection. Especially with a bag 10 having walls formed from more than two layers of materials, it can be difficult to ensure a quality heat seal of all of the layers of materials at this intersection. Further, to ensure that excess material is provided at the bottom wall 16 of the bag 10, the heat seal 80 is disposed outboard of the location or point 91 where the inclined lines of connection 64, 66 defining the bottom wall 16 of the bag 10 would intersect if these lines of connection were extended. Thus, in accordance with one aspect of the present invention, there is no single point of intersection 91 wherein all of the layers of material are heat sealed together and in addition, excess material is provided in the bottom wall of the bag 10 to prevent the heat seals 64, 66 and bottom wall 16 from being pulled taut and bearing significant loads at least when the bag 10 is disposed on a support surface.

Figure 8:
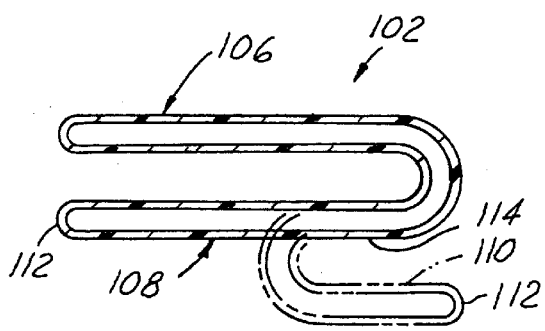
FIG. 8 is an end view of a tubular blank folded according to a second embodiment of the invention.
Figure 9:
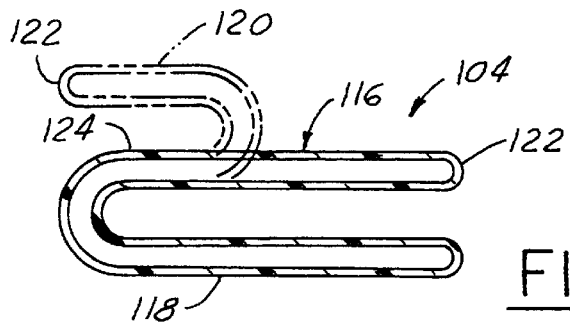
FIG. 9 is an end view of a complementary blank for use with the blank as shown in FIG. 8.

FIGS. 8–12 illustrate a bag 100 and a method of forming it according to a second embodiment of the invention utilizing two tubular blanks 102, 104 folded and heat sealed together to define a bag 100 or liner having walls formed from two layers of material. As shown in FIG. 8, a first tubular blank 102 is folded in half lengthwise to provide generally flat upper and lower panels 106, 108 each comprised of two layers of material. Thereafter, the lower flat panel 108 is folded in half lengthwise by taking a half 110 of the panel 108 containing a free edge 112 and folding it back onto and under the other half 114 of that panel 108 as illustrated in phantom lines in FIG. 8. Similarly, as shown in FIG. 9, a second tubular blank 104 is first folded lengthwise in half to define upper and lower flat panels 116, 118 each comprised of two layers of material. The upper flat panel 116 is then folded in half by taking a half 120 of the upper flat panel 116 containing its free edge 122 and folding it back on top of the other half 124 of the upper flat panel 116 as generally illustrated by the phantom lines in FIG. 9. The tubular blanks 102, 104 may be formed from elongate tubular webs of material and the folding of each blank 102, 104 may be accomplished in an assembly line utilizing appropriate mandrels or rollers over which the web is guided to form a plurality of interconnected bags 100 from the webs.

Figure 10:
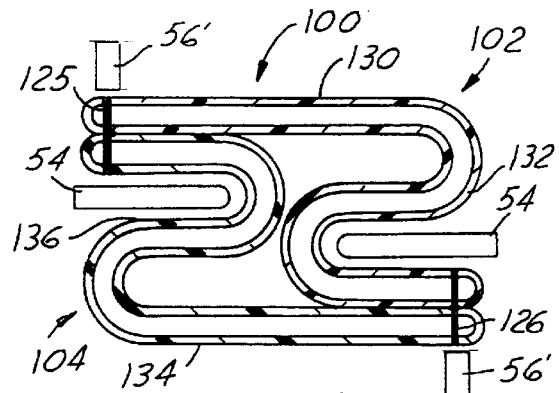
FIG. 10 is a cross sectional view of a gusseted blank formed from the tubular blanks of FIG. 8 and FIG. 9 heat sealed together.

As shown in FIG. 10, the first tubular blank 102, folded as described with reference to FIG. 8, is disposed on and overlying the second tubular blank 104, folded as described with reference to FIG. 9. The folded tubular blanks 102, 104 are heat sealed along two lines 125, 126 to interconnect only the adjacent free edges of the tubular blanks 102, 104. Again, a rubber or Teflon pad 54 may be inserted between the folded or gusseted portions of the blanks 102, 104 to prevent them from being heat sealed together by the heat selaers 56'. So connected, the first tubular blank 102 defines an upper flat panel 130 and a right gusseted panel 132 and the second tubular blank 104 defines a lower flat panel 134 and a left gusseted panel 136 with each panel 130, 132, 134, 136 adapted to define a side wall 140 of the bag 100. Desirably, only two of the four junctures between adjacent side walls 140 are defined by the heat seal lines 124, 126. This reduces the number of heat seals needed to form the bag 100 and simplifies its manufacture.

Figure 11:
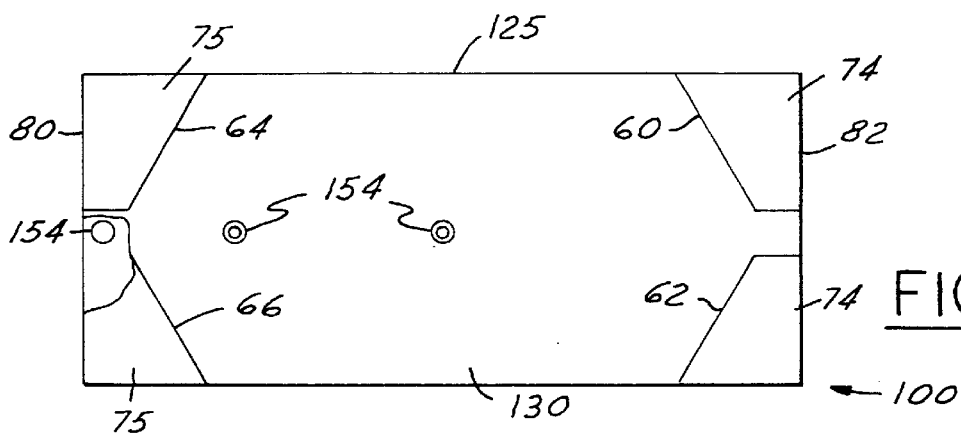
FIG. 11 is a perspective view of the blank of FIG. 10 with additional heat seal lines to form top and bottom walls of the bulk bag.
Figure 12:
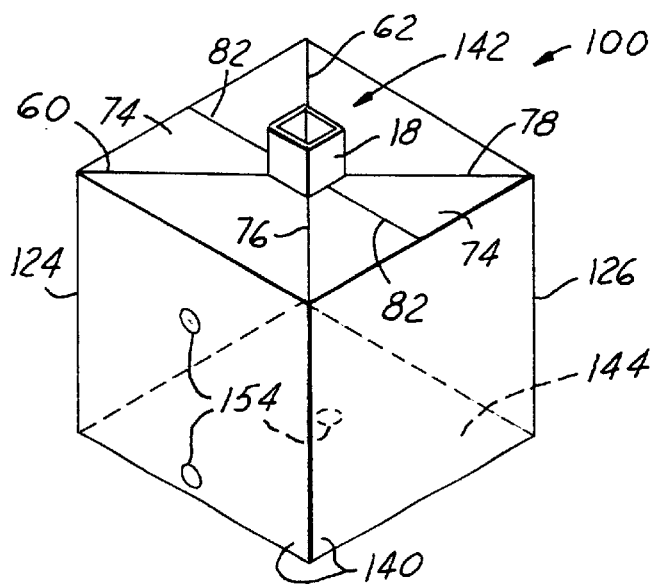
FIG. 12 is a perspective view of the bulk bag of FIG. 11 in its expanded or filled state.
Figure 13:
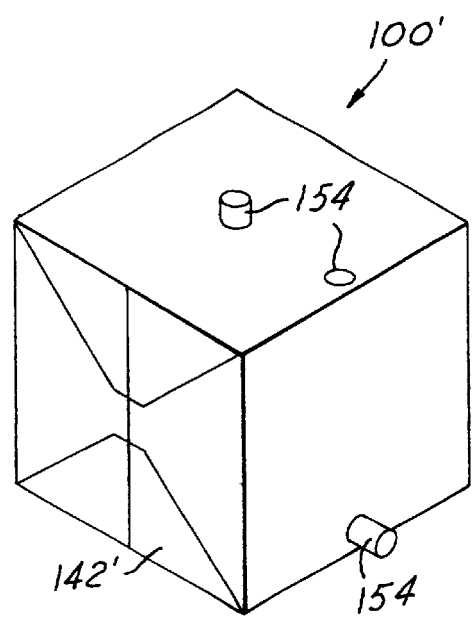
FIG. 13 is a perspective view of a modified bag in its expanded or filled state.

As shown in FIGS. 11 and 12, the remainder of the bag 100 is preferably formed in the same manner as the bag 10 with the same reference numbers used to denote similar portions of the bag 100 as were used with reference to the bag 10. Desirably, before the tubular blanks 102, 104 are heat sealed together as shown in FIGS. 10–12, one or more openings or separate spouts 154 may be heat sealed or otherwise connected to the appropriate panels to dispose them in their desired locations when the bag 100 is filled and expanded into its generally cubical configuration as shown in FIG. 12. Alternatively, after the heat seals connecting the first and second tubular blanks 102, 104 are provided the bag may be slit open along one side edge or substantially any other portion of the bag to provide access to the interior of the bag so that spouts may be provided or holes formed in an appropriate panel of the blanks. This provides a wide variety of possible locations for the spouts 154 or openings in the bag 100 and permits one or more of these spouts or openings to be formed in the top or bottom walls 142, 144 defined by the inclined heat seal lines as well as in any of the side walls 140 as shown in FIGS. 11 and 12. Further, while the bag 100 has been described with reference to the top and bottom walls being formed by the inclined heat seal lines, as shown in FIG. 13, a bag 100' may be oriented in other positions such that the wall 142' and a second wall (not shown) formed by the inclined heat seal lines define side walls of the bag 100'.

Figure 14:
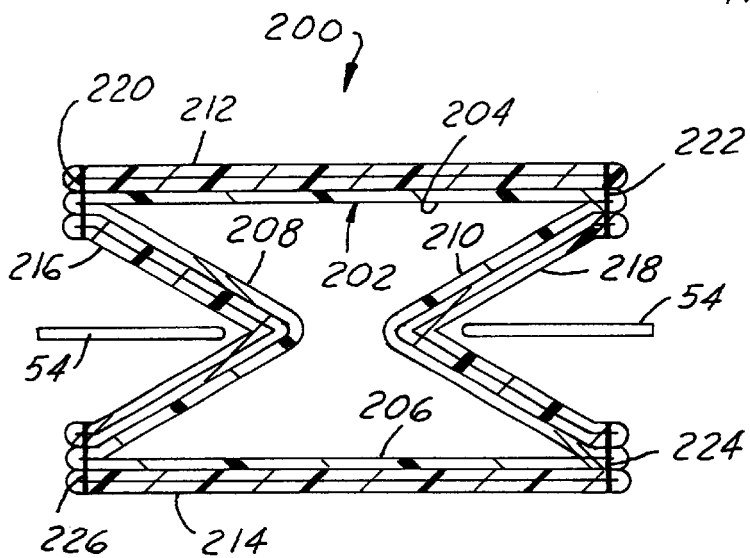
FIG. 14 is a sectional view illustrating a plurality of tubular blanks connected together to define a bulk bag having walls formed from three layers of material according to a third embodiment of the invention.

FIG. 14 illustrates a bag 200 and a method of making it according to a third embodiment of the invention and having walls each formed from three layers of material. In making bag 200, a first tubular blank 202 is gusseted to provide a pair of flat panels 204, 206 of a single layer of material with a pair of gusseted panels 208, 210 received between the flat panels 204, 206 and also formed of a single layer of material. A second tubular blank 212 is disposed on top of the upper flat panel 204, a third tubular blank 214 is disposed beneath the lower flat panel 206, and fourth and fifth tubular blanks 216, 218 are folded and arranged in a complementary fashion to the gusseted panels 208, 210 of the first tubular blank 202.

Heat seal line 220 is formed to connect the adjacent edges of the first tubular blank 202, second tubular blank 212 and fourth tubular blank 216. Heat seal line 222 is formed to connect together the adjacent edges of the first tubular blank 202, second tubular blank 212 and fifth tubular blank 218. Heat seal line 224 is formed to connect together the adjacent portions of the first tubular blank 202, third tubular blank 214 and fifth tubular blank 218. Heat seal line 226 is formed to connect together the adjacent edges of the first tubular blank 202, third tubular blank 214 and fourth tubular blank 216. A rubber or Teflon pad 54 is preferably disposed between the adjacent panels of the fourth and fifth tubular blanks 216, 218 to prevent them from being heat sealed together.

In a similar manner as that described for the other embodiments of the bags 10, 100, inclined heat seal lines are formed to provide generally rectangular top and bottom walls of the bag 200. Additionally, spouts may be formed in one or both ends of the bag 200 as described with reference to the first and second embodiments of bags 10, 100. So formed, each wall of the bag is comprised of three layers of material. Desirably, the innermost layer of material is defined entirely by the inner or first tubular blank 202 and may be of a different material than the other layers of material which are defined by the separate tubular blanks 212, 214, 216, 218. Desirably, the first tubular blank 202 may be formed of a material particularly adapted for use with a particular substance, such as a food product or a corrosive or toxic substance, as examples, while the outer layers of material may be highly resistant to puncture, rupture or otherwise have desired mechanical or chemical properties. The first tubular blank 202 may also be provided over or outside of the other tubular blanks 212, 214, 216, 218 as opposed to being inside of the other blanks to form a bag wherein each wall is formed of three layers of material.

While the embodiments of this invention have been described with reference to bags or liners having walls formed of two or three layers of material, modifications or variations will be readily apparent to those skilled in the art. For instance, by replacing the first tubular blank 202 of bag 200 with a gusseted blank of the arrangement of either FIG. 4 or FIG. 10, a bag with each wall having four layers of material is formed. Other combinations of tubular blanks to provide still further additional layers of material of each wall of the bag are also possible and will be readily recognized by those skilled in the art. Still further, while the lines of connection between the blanks used to form the bags have been described herein as heat seals, other methods of connection, including but not limited to stitching, stapling and joining with adhesive, may also be employed as desired.

What is claimed is:

1. A method of forming a bulk bag comprising the steps of:
   a) providing at least two tubular blanks of material each having a pair of opposed side edges and a pair of opposed ends;
   b) arranging the tubular blanks to form a pair of gusseted panels disposed between a pair of generally flat panels with each gusseted panel and each flat panel having at least two layers of material;
   c) connecting together the free edges of the tubular blanks to define four interconnected side walls of the bag with each side wall formed from at least two layers of material; and
   d) connecting together the flat blanks with adjacent portions of the gusseted blanks along inclined lines of connection from the side edges of the flat panels extending inwardly towards the center of the blank to form a pair of end walls interconnected to the side walls with one end wall at each of a pair of opposed ends of the side walls and each end wall formed from at least two layers of material.

2. The method of claim 1 wherein in step a) four tubular blanks are provided with each tubular blank defining a separate one of the flat panels and gusseted panels.

3. The method of claim 1 wherein in step a) two tubular blanks are provided with each tubular blank arranged in step b) to define one flat panel and one gusseted panel.

4. The method of claim 1 wherein in step d), the inclined lines of connection forming at least one end wall of the bag extend at an acute included angle of between 43° and 45° from the side edges of the flat panels.

5. The method of claim 3 wherein in step c) the free edges of each tubular blank are connected to a corresponding free edge of the other tubular blank providing two lines of connection between the tubular blanks and a circumferentially continuous blank with a pair of gusseted panels and a pair of flat panels each formed from two layers of material.

6. The method of claim 1 wherein the tubular blanks are provided in elongate webs of material.

7. The method of claim 1 wherein in step d) the inclined lines of connection are terminated before they intersect and spaced apart parallel lines of connection are provided to connect together the adjacent portions of the flat panels and gusseted panels, and a transverse line of connection is provided to connect all of the panels and is disposed outwardly of the point at which the inclined lines of connection would intersect if they were extended.

8. The method of claim 1 which also comprises, before step c), the steps of:
   1) providing an additional tubular blank of material adjacent to the other tubular blanks; and
   2) folding said additional tubular blank to form a pair of gusseted panels disposed between a pair of flat panels with each gusseted panel and each flat panel of said additional tubular blank complementary to and adjacent to corresponding gusseted panels and flat panels of the other tubular blanks to form gusseted panels and flat panels each having three layers of material.

9. The method of claim 1 wherein in step d) at one end of the blanks, the inclined lines of connection are terminated short of a point at which they would intersect and spaced apart, parallel lines of connection are provided from said one end of the blanks to the terminated inclined lines of connection to define a spout on one end wall of the bag.

10. The method of claim 1 wherein each connection between the blanks is accomplished by heat sealing.

11. A bulk bag, comprising:
    four interconnected rectangular side walls formed from two blanks of material each comprising two layers of material with a separate juncture defined between each pair of adjacent side walls for a total of four junctures, two of said junctures being defined by a line of connection joining together the two blanks of material and each of the other two junctures defined by a fold in a separate one of the blanks of material; and
    opposed rectangular top and bottom walls each defined in part by both of the blanks and disposed on opposed ends of the side walls with each of the top and bottom walls connected to each of the side walls.

12. The bag of claim 11 wherein each blank of material is tubular and has a pair of opposed edges with each of said opposed edges of one blank joined to a separate one of said opposed edges of the other blank along a line of connection.

13. The bag of claim 11 wherein the top and bottom walls are defined by inclined lines of connection joining together adjacent portions of the two blanks of material.

14. The bag of claim 11 wherein each line of connection is a heat seal.

15. A bulk bag, comprising:
    four rectangular side walls each having two layers of material and defined by a separate one of four tubular blanks of material each having a pair of opposed edges with each of said opposed edges of one tubular blank joined to a separate one of said opposed edges of a different tubular blank along a line of connection; and
    opposed rectangular top and bottom walls each defined in part by all four of the tubular blanks and disposed on opposed ends of the side walls with each of the top and bottom walls connected to each of the side walls.

* * * * *